United States Patent [19]

Daniels et al.

[11] Patent Number: 4,719,379

[45] Date of Patent: Jan. 12, 1988

[54] STRAIN RELIEF FOR ELECTRIC MOTOR POWER CORD

[75] Inventors: Nicholas R. Daniels; Roy C. Eliason, both of St. Louis, Mo.

[73] Assignee: Emerson Electric Co., St. Louis, Mo.

[21] Appl. No.: 28,567

[22] Filed: Mar. 20, 1987

[51] Int. Cl.⁴ .................................... H01K 13/58
[52] U.S. Cl. .............................. 310/71; 439/472
[58] Field of Search ...................... 310/71, 89, 90; 339/103 M, 105, 107

[56] References Cited

U.S. PATENT DOCUMENTS

| | | | |
|---|---|---|---|
| 2,309,741 | 2/1943 | Woodward | 339/105 |
| 4,095,043 | 6/1978 | Martin et al. | 339/105 |
| 4,178,057 | 12/1979 | McCormack | 339/103 M |
| 4,444,449 | 4/1984 | Aysta et al. | 449/103 M |
| 4,508,411 | 4/1985 | Hughes et al. | 339/103 M |

Primary Examiner—Peter S. Wong
Assistant Examiner—D. L. Rebsch
Attorney, Agent, or Firm—Polster, Polster and Lucchesi

[57] ABSTRACT

A strain relief for an electric motor power lead in which the power lead is turned at substantially a right angle and fitted between two spaced fingers carried by one endshield of the motor, with the fingers having opposed gripping surfaces thereon. An abutment carried by the outer endshield of the motor is forceably drawn into the opening between the fingers upon the endshields being firmly secured to the motor so as to cause the fingers and the abutment to firmly grip the power cord.

4 Claims, 7 Drawing Figures

STRAIN RELIEF FOR ELECTRIC MOTOR POWER CORD

BACKGROUND OF THE INVENTION

This invention relates to a strain relief structure for the power cord of a dynamoelectric machine (e.g., an electric motor).

Electric motors oftentimes provide a means for supporting or relieving strain from the electrical power cord supplying power to the motor. This may involve the use of a synthetic resin or other electrically insulative grommet inserted into an opening in the shell of the motor, with the grommet receiving and gripping the power lead. In that manner, in the event a tension or pulling load in any direction is applied to the power cord, the load is transmitted from the power cord to the structure of the electric motor without placing undue strain on the connections between the power cord and the lead wires of the windings of the motor. However, in certain motor applications where the motor moves relative to its power cord, there are requirements of testing agencies, such as Underwriters Laboratory (UL), that tension loads of a predetermined amount be capable of being transmitted from the power cord to the electric motor without damage to either the power cord or to the connections between the power cord and the motor lead wires.

More particularly, in an application for an electric motor utilized to power a radial arm wood saw, in which a direct drive motor is movable relative to a workpiece and in which the rotor shaft of the motor carries a saw blade, Underwriters Laboratory requires that the strain relief provided for the motor power cord be capable of transmitting a 35-pound load from the power cord to the structure of the motor without damage to either the power cord or to the lead wire connections within the motor. Heretofore, without the provision of adjustable clamp strain reliefs, it has been difficult to ensure that the power cord would be reliably strain relieved in such manner as to transmit such high loads to the motor, especially when variation in thickness of the power cord within a reasonable tolerance is taken into account. However, adjustable clamp strain relief systems typically included a screw-type clamp which required separate installation and assembly operations and which could work loose during operation of the motor.

SUMMARY OF THE INVENTION

Among the several objects and features of the present invention may be noted the provision of a strain relief construction for an electric motor which reliably and repeatedly engages the power cord for the electric motor in such manner as to transmit tension loads from the power cord to the electric motor in excess of 35 pounds;

The provision of such a strain relief which does not require the provision of any separate parts or assembly steps and which, upon assembly of the motor, readily grips the power cord and accommodates a relatively wide variation in dimensional tolerances between the thickness of the power cord;

The provision of such a strain relief which does not damage the power cord or the electrical insulation thereon; and The provision of such a strain relief which is of rugged construction, which automatically engages the power cord upon assembly of the motor, and which is reliable in operation.

Other objects and features of this invention will be in part apparent and in part pointed out hereinafter.

Briefly stated, this invention relates to a dynamoelectric machine or electric motor which has a stator including a core. The core has a central bore therethrough and a plurality of slots extending radially outwardly from the bore. Windings are inserted in these slots. The motor further has a rotor insertable in and rotatable within the central bore, the rotor having a rotor body and a rotor shaft extending endwise from the rotor body. The motor has a power cord connected to the windings for energization thereof. A bearing support is provided at each end of the stator, with the bearing supports each having a bearing for receiving and journaling a respective end of the rotor shaft. Means is provided for drawing the endshields toward one another into engagement with the ends of the core. Specifically, this invention relates to means for gripping the power cord so as to provide positive strain relief for the power cord relative to the motor. The power cord gripping means comprises a ledge on one of the bearing supports and an abutment on this one bearing support substantially perpendicular to the ledge, with the abutment facing axially with respect to the dynamoelectric machine toward the other bearing support. The abutment has a relatively narrow bead thereon for engagement with the power cord. The other bearing support has an arm extending generally axially toward the abutment on the one bearing support for engagement with the power cord. The outer end of the arm has a pair of spaced fingers, with each of these fingers having a respective bead on the inner face thereof. The spaced fingers define an opening therebetween for receiving the power cord therein. The beads on the fingers are spaced apart from one another a distance somewhat less than the thickness of the power cord for forceable engagement with the power cord. The abutment is in axial alignment with the opening between the fingers. Thus, with the power cord disposed on the shelf and being bent with respect to the ledge so as to pass between the fingers and in front of the abutment, upon forceably drawing the bearing supports together, the abutment at least in part enters the opening and forces the power cord into engagement with the beads on the abutment, and forces the power cord into engagement with the beads on the fingers such that the abutment bead engages the power cord in axial direction therealong, and such that the beads on the fingers engage the power cord on opposite sides thereof generally perpendicular to the power cord.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
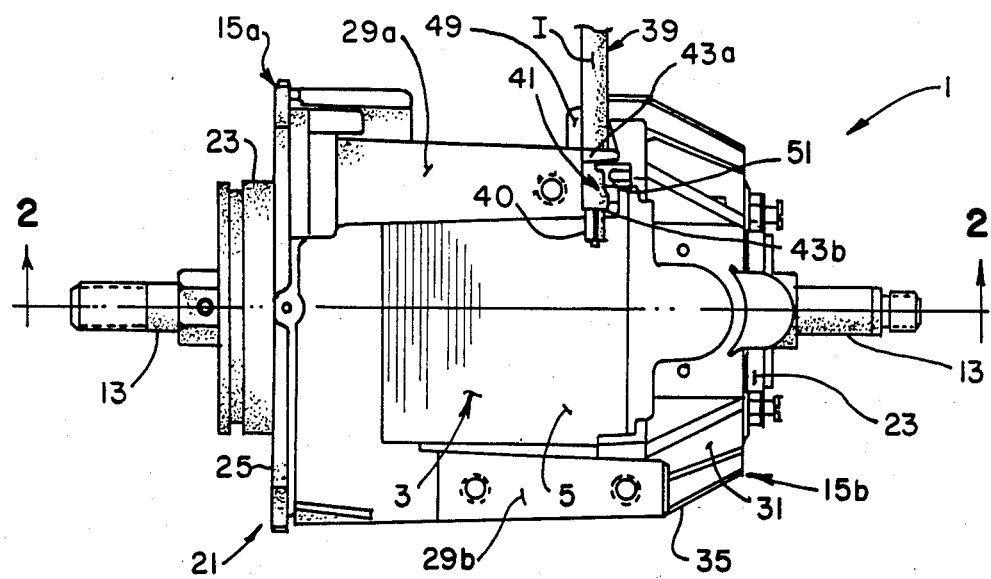
FIG. 1 is a top plan view of a dynamoelectric machine (electric motor), incorporating the strain relief of the present invention.
Figure 2:
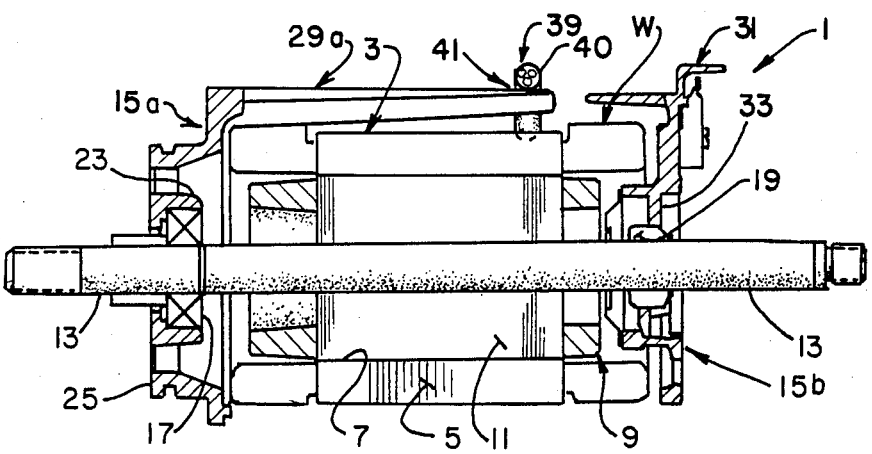
FIG. 2 is a vertical, longitudinal cross section, taken along line 2—2 of FIG. 1.

Referring now to the drawings, a dynamoelectric machine or electric induction motor is indicated in its entirety by reference character 1. Motor 1 is shown to comprise an open frame-type motor. However, those skilled in the art will recognize that the invention described herein can be utilized with dynamoelectric machines or motors of a variety of construction types.

Specifically, motor 1 comprises a stator 3 having a core 5 comprising a stack of laminations of suitable ferromagnetic material. Each of the laminations has a central opening therewithin so as to define a central bore 7 for core 5, and further has a number of notches extending radially from the central opening so as to form radial slots through the core, with these radial slots receiving coils of wire so as to constitute the windings W of stator 3.

Further, motor 1 comprises a rotor 9 having a rotor body 11 of squirrel cage construction rotatably received within central bore 7 of core 5. The rotor further has a rotor shaft 13 extending endwise from each end of rotor body 11. A pair of bearing supports or endshields, as generally indicated at 15a, 15b, is rigidly attached to the end faces of core 5. Bearing support 15a has a ball bearing 17 supported thereby, and endshield 15b carries a self-aligning bearing 19, with these bearings receiving and journaling a respective end of rotor shaft 13. Bearing supports 15a, 15b journal the rotor shaft and maintain rotor body 11 centered within central bore 7 of core 5.

Figure 4:
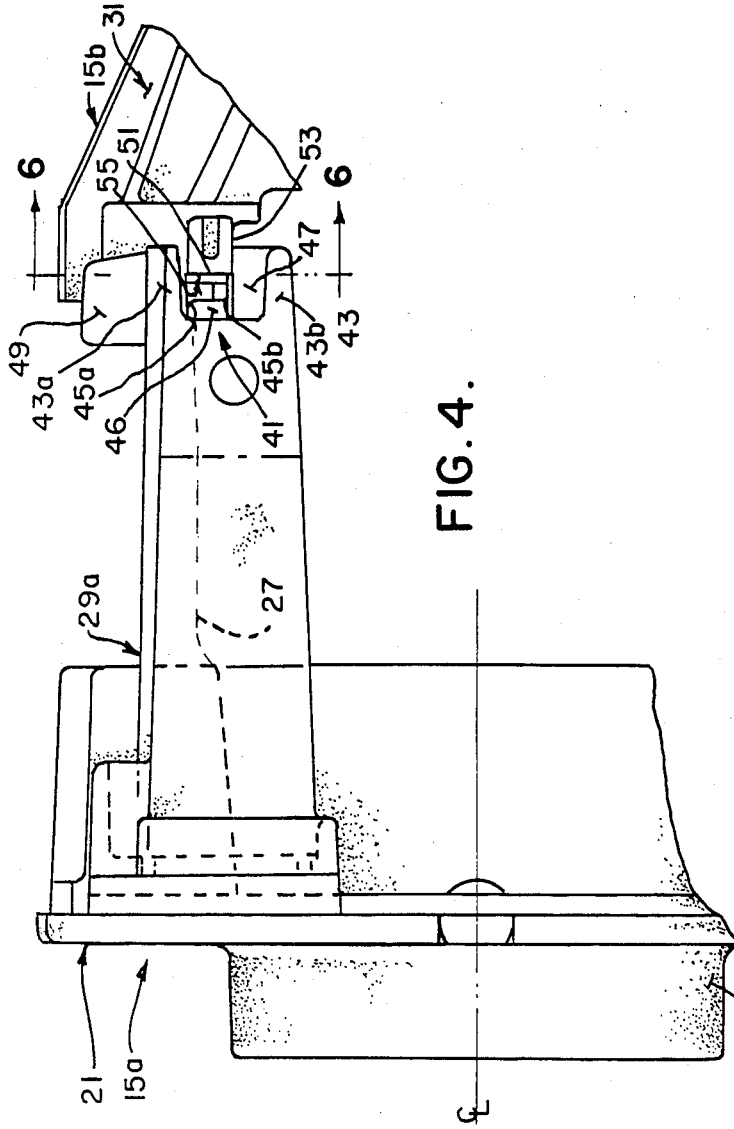
FIG. 4 is a partial top plan view of the motor, similar to FIG. 1, on an enlarged scale, illustrating details of the strain relief of the present invention.

More specifically, bearing support 15a is made of a unitary die casting 21 of a suitable aluminum alloy or the like. Die casting 21 has a central hub 23 for receiving ball bearing 17. Die casting 21 further has an outer face 25 and, as shown in FIG. 4, outer face 25 has a plurality of contact points 27 firmly engageable with a respective end face of core 5. Further, die casting 21 has a pair of axially extending arms 29a, 29b on the top thereof extending lengthwise or axially of the motor and being disposed on the outside of core 5 for purposes as will appear.

Figure 3:
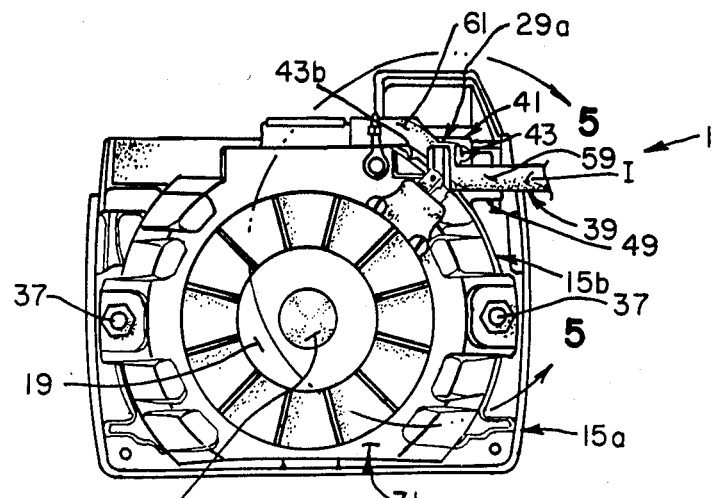
FIG. 3 is a righthand side elevational view of FIG. 1.
Figure 5:
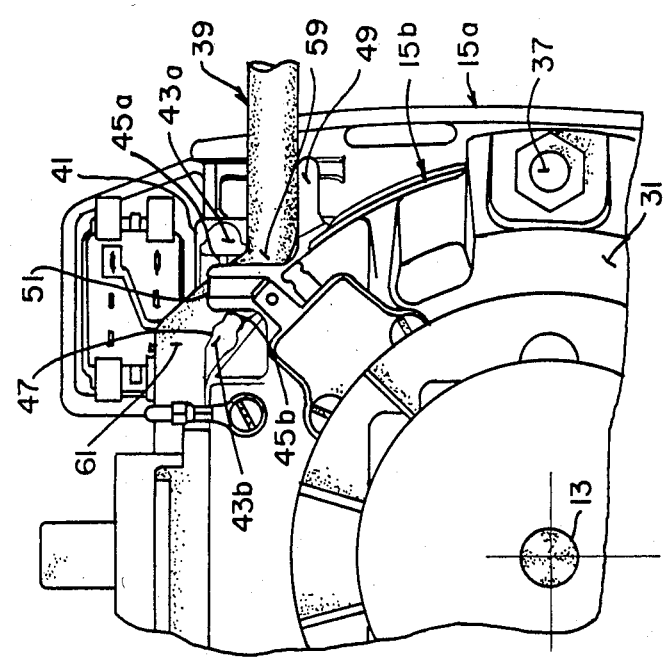
FIG. 5 is a partial sectional view, taken along line 5—5 of FIG. 3, illustrating the strain relief of the present invention.
Figure 7:
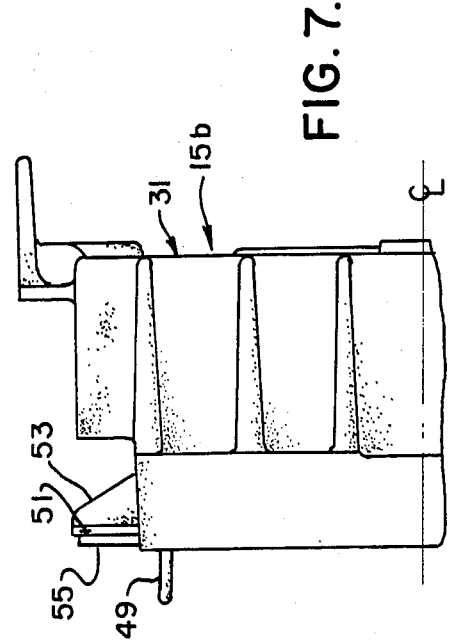
FIG. 7 is a right side elevational view of FIG. 6.
Figure 6:
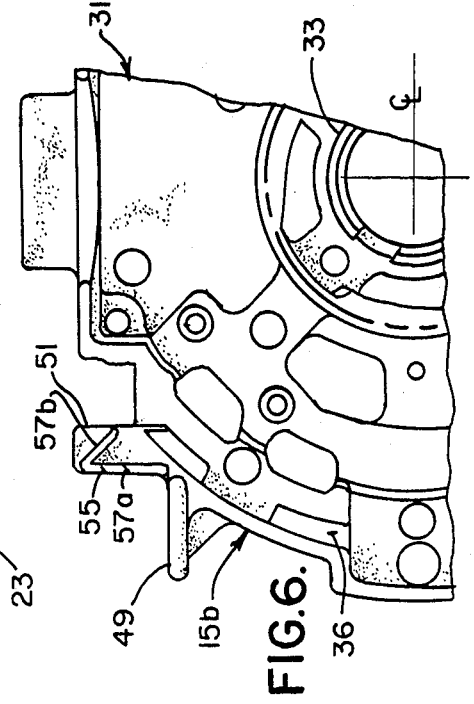
FIG. 6 is a vertical cross sectional view, taken along line 6—6 of FIG. 4, with parts removed, illustrating a ledge and an abutment carried by one of the bearing supports of the motor, and constituting part of the strain relief of the present invention.

Bearing support 15b is constituted by an integral die casting 31 having a central hub 33 for receiving self-aligning bearing 19. Die casting 31 has side portions 35 incorporating inner contact points 36 (as shown in FIG. 6) which engage a respective end face of core 5. With bearing supports 15a, 15b disposed on opposite end faces of core 5, and with the contact points 27 of die casting 21 in engagement with the core, and with contacts 36 of die casting 31 also in engagement with the core, through bolts 37 (as shown in FIGS. 3 and 5) may be inserted through suitable openings provided in each of the bearing supports so as to draw the bearing supports together into firm engagement with opposite end faces of core 5, thereby to securely mount the bearing supports relative to the core with rotor body 11 substantially centered within bore 7 and clear of core 5.

Motor 1 includes a power cord, as indicated at 39. As is typical, power cord 39 comprises a plurality of individually insulated lead wires 40 enwrapped in a suitable fibrous material which provides strength to the power cord. Then, the fibrous material is covered with a suitable synthetic resin insulation I which protects the fibrous material, adds additional strength and which further electrically insulates the power cord.

In accordance with this invention, means, as generally indicated at 41, is provided for engaging the outer surface of insulation I of power cord 39 and securing the power cord relative to motor 1, thereby to transmit tension or pulling loads in any direction from power cord 39 to the motor and for relieving strain between the connections of the power lead wires 40 of cord 39 to the winding leads (not shown) within the motor.

More specifically, arm 29a on die casting 21 of endshield 15a has a pair of spaced fingers 43a, 43b on the end thereof. These fingers each have a longitudinal, narrow bead, as indicated at 45a, 45b, respectively, on their inner faces, with the beads 45a, 45b being substantially opposed to one another, and defining an opening 46 (see FIG. 4) therebetween for receiving power cord 39. Further, finger 43b is provided with an inclined ramp 47, as shown in FIGS. 4 and 5, which extends upwardly from bead 45b of finger 43b and from the opening 46 between the fingers 43a and 43b toward the centerline of the motor. As shown in FIG. 4, beads 45a, 45b converge toward one another along the length of opening 46 from the open end between the fingers toward the back of the opening for wedgingly engaging power cord 39 in a manner as will appear.

Further, strain relief means 41 is shown to comprise a ledge 49 on the other endshield 15b having an upper horizontal surface which is integrally cast with die casting 31 of the other endshield or bearing support 15b. Proximate ledge 49, a vertically extending abutment 51 is also provided on casting 31, with the abutment being supported by a stiffener 53 on the back side of the abutment. The face of the abutment facing toward endshield 15a has a generally angle-shaped power cord gripping bead 55 having a vertical bead portion 57a and an inclined bead portion 57b, as best shown in FIG. 6. The width of abutment 51 is somewhat less than the spacing between fingers 43a, 43b of arm 29a such that upon assembly of the endshields on core 11, abutment 51 at least in part enters opening 46.

In accordance with this invention, upon assembly of endshields 15a and 15b onto stator 3, prior to assembling the endshields on the stator, power cord 39 is disposed on the upper horizontal surface of ledge 49 of endshield 15b. As indicated at 59 in FIG. 5, power cord 39 is bent upwardly generally in front of abutment 51 so as to be received within opening 46 between fingers 43a, 43b of arm 29a of the other endshield 15a. Above the level of beads 45a, 45b on fingers 43a, 43b, the power cord is supported on inclined face 47 on finger 43b. As indicated at 61, the power cord may be again optionally bent or turned to a horizontal position above the elevation of finger 43b.

In accordance with this invention, with the power cord disposed on the upper surface of ledge 49, in front of abutment 51 and within opening 46 between fingers 43a and 43b, as heretofore described, upon securing bearing supports or endshields 15a, 15b on their respective outer faces of core 5 of stator 3 by means of tightening throughbolts 37, the endshields 15a, 15b are forceably drawn toward one another. As the endshields are forceably drawn toward one another, abutment 51 at least in part enters between fingers 43a, 43b of arm 29a and wedgingly forces power cord 39 into opening 46 and into firm gripping engagement with gripping beads 45a, 45b on the inner faces of respective fingers 43a, 43b. In this manner, beads 45a, 45b are disposed in such manner as to be substantially perpendicular to the axis of the power cord and thus deformably grip the insulation I of the power cord along localized lines of contact on substantially diametrically opposed sides of the power cord. Simultaneously, the angle-shaped bead 55 on the outer face of abutment 51 is positively drawn into engagement with one face of the power cord in the region of the power cord now gripped by beads 45a, 45b, as heretofore described. It will be appreciated that, because of the inclination of power cord 39 as it extends upwardly and inwardly from ledge 49 into opening 46, the generally vertical bead portion 57a of bead 55 engages the power cord in a direction generally diagonal to the axis of the power cord, while the inclined bead portion 57a engages the power cord in a generally perpendicular fashion relative to the longitudinal axis of the power cord.

Further, depending on the initial diameter and tolerances of power cord 39, upon drawing the endshields 15a, 15b together, abutment 51 wedgingly forces the power cord into the opening 46 between fingers 43a, 43b in the manner heretofore described, and the power cord is positively held captive between beads 45a, 45b on fingers 43a and 43b and between the bead 55 on the outer face of abutment 51. In this manner, it will be appreciated that all sides of the power cord are grippingly engaged by portions of fingers 43a, 43b, by the end arm 29a at the base of opening 46, and by the abutment 51. It will be appreciated because of bend 59 adjacent the intersection of ledge 49 and abutment 51, and further because of the optional bend 61 in the power cord above finger 43b, tension loads may be readily transmitted from power cord 39 to the structure of motor 1 constituting strain relief means 41 such that the power cord may is positively gripped by the above-discussed components constituting strain relief means 41 thereby to efficiently transmit relatively high tension or pulling loads from the power cord to the motor structure, without permitting slippage of the power cord relative to the motor structure, and without placing strain on the connection between the leads 40 of power cord 39 and the leads (not shown) of the motor windings W. Further, because the beads 45a, 45b on fingers 43a, 43b, respectively, converge toward the closed end of the opening therebetween, the strain relief means of the present invention has the capability of taking up relatively wide dimensional tolerances in the diameter of power cords 39 and yet, still retaining adequate strain relief capability. In accordance with this invention, strain relief 41 does not require the installation of any separate parts, inasmuch as all components are integral with endshield die castings 21 and 31 such that all components cooperate with power cord 39 upon assembly of the motor.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. In a dynamoelectric machine comprising a stator having a core, the latter having a central bore extending longitudinally therethrough, a plurality of slots extending radially outwardly from a central bore, windings inserted in said slots, said dynamoelectric machine further having a rotor insertable in and rotatable within said central bore, said rotor having a rotor body disposed within said central bore and a rotor shaft extending endwise from said rotor body, said dynamoelectric machine further having a power cord electrically connected to said windings for energization thereof, a bearing support at each end of said stator, said bearing supports each having a bearing for receiving and journaling a respective end of said rotor shaft, and means for securing said endshields in firm engagement with said core, wherein the improvement comprises: means for gripping said power cord so as to provide positive strain relief for said power cord relative to said dynamoelectric machine, said power cord gripping means comprising a ledge on one of said bearing supports, an abutment on said one bearing support substantially perpendicular to said ledge and facing axially with respect to said dynamoelectric machine toward said other bearing support, said abutment having a relatively narrow bead thereon for engagement with said power cord, said other bearing support having an arm thereon extending generally axially toward said abutment, the outer end of said arm having a pair of spaced fingers, with each of these fingers having a bead on the inner face thereof for engaging said power cord on opposite sides thereof, said spaced fingers defining an opening therebetween for receiving said power cord, said beads on said fingers being spaced apart a distance somewhat less than the thickness of said power cord, said abutment being in substantial axial alignment with said opening, said power cord being disposed on said ledge and being bent with respect to said ledge so as to pass between said fingers and in front of said abutment such that upon securing said bearing supports to said core, said abutment at least in part enters said opening between said fingers and forces said power cord into engagement with said beads on said fingers and forces said power cord into engagement with said bead on said abutment such that said abutment bead engages said power cord in one direction along said power cord and such that said finger beads engage said power cord on substantially opposite sides thereof generally perpendicular to the direction said abutment bead engages said cord.

2. In a dynamoelectric machine as set forth in claim 1 wherein said beads on said fingers converge inwardly toward one another from the open to the closed end of said opening so that upon said power cord being forced into said opening between said fingers by said abutment upon drawing said bearing supports toward one another, said beads on said fingers wedgingly engage said power cord.

3. In a dynamoelectric machine as set forth in claim 1 wherein said bead on said abutment has a first portion extending generally diagonally with respect to the axis of said power cord, and another portion of said bead extending generally perpendicularly with respect to said power cord.

4. A strain relief for a power cord of an electric motor, said electric motor comprising a stator having a core, said core having a central bore extending longitudinally therethrough, a plurality of slots extending radially outwardly from said bore, windings inserted in said slots, said motor further having a rotor installable in and rotatable within said central bore, said rotor having a rotor body and a rotor shaft extending endwise from said rotor body, said motor having a power lead connected to said windings for energization thereof, a bearing support at each end of said stator, each of said bearing supports having a bearing for receiving and journaling said rotor shaft, and means for forceably drawing said endshields toward one another, said strain relief comprising means for gripping said power cord so as to provide positive strain relief for said power cord relative to said motor, said power cord gripping means comprising a ledge on one of said bearing supports and an abutment on said one bearing support substantially perpendicular to said ledge and facing generally axially with respect to said motor toward said other bearing support, said abutment having a relatively narrow bead thereon for engagement with said power cord, said other bearing support having an arm thereon extending generally axially toward said abutment on one said bearing support for engagement with said power cord, the outer end of said arm having a pair of spaced fingers thereon, each of said fingers having a respective power cord engaging bead on the inner face thereof, said spaced fingers defining an opening therebetween for receiving said power cord therewithin, said beads on said fingers being spaced apart a distance somewhat less than the thickness of said power cord, said abutment being in axial alignment with said opening, said power cord being disposed on said horizontal ledge and being bent upwardly with respect to said ledge so as to pass between said fingers and in front of said abutment such that upon forceably drawing said bearing supports together, said abutment at least in part enters said opening between said fingers for forcing said power cord into positive engagement with said beads on said fingers and for forcing said power cord into engagement with said bead on said abutment such that said abutment bead engages said power cord in generally two directions therealong, and such that said finger beads engage said power cord on substantially opposite sides thereof generally perpendicularly of said power cord.

* * * * *